Nov. 1, 1938.  W. F. GERHARDT ET AL  2,135,073
VEHICLE
Filed June 21, 1937  2 Sheets-Sheet 1
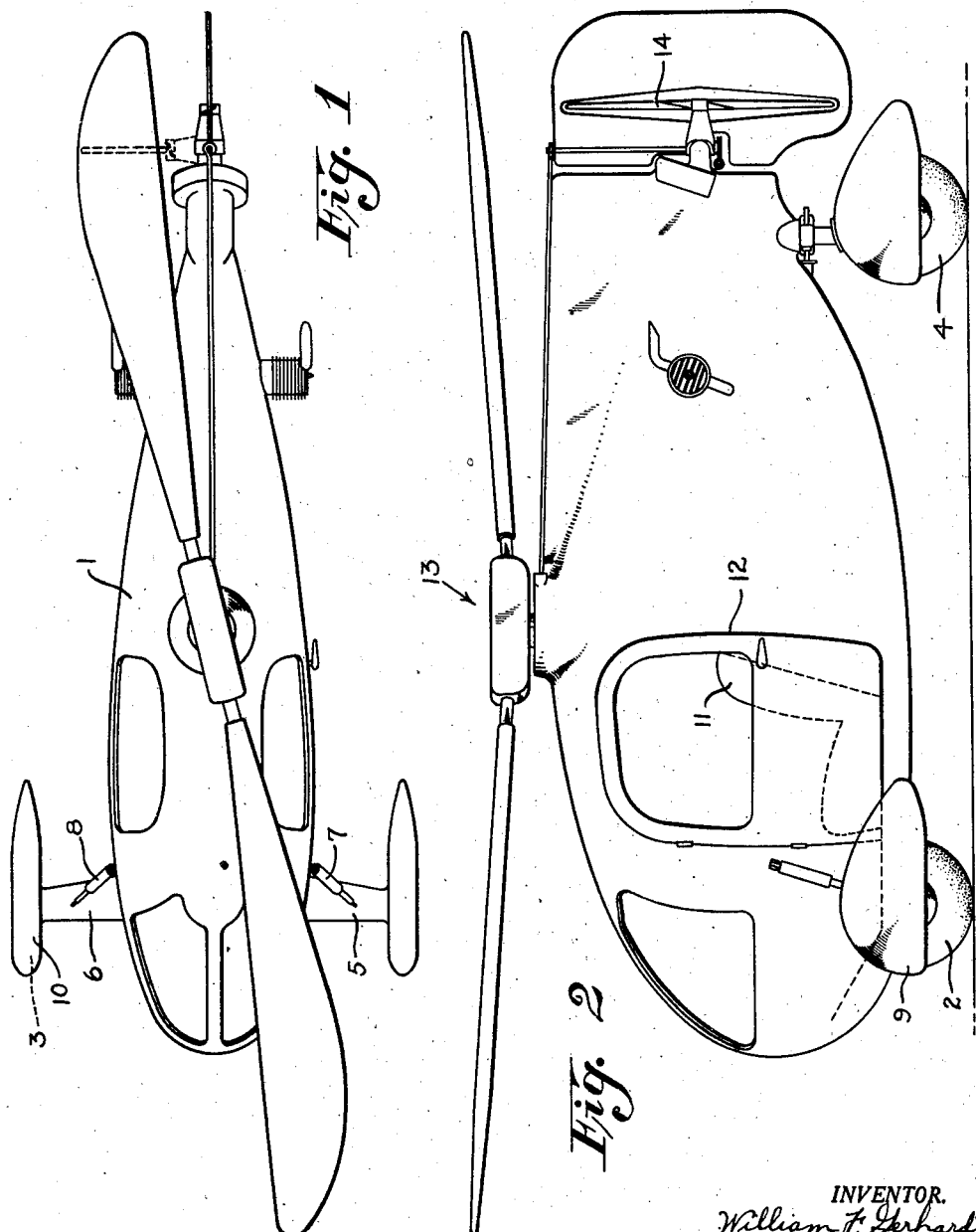
INVENTOR.
William F. Gerhardt
BY William H. Horn
ATTORNEY Nov. 1, 1938.  W. F. GERHARDT ET AL  2,135,073
VEHICLE
Filed June 21, 1937   2 Sheets-Sheet 2
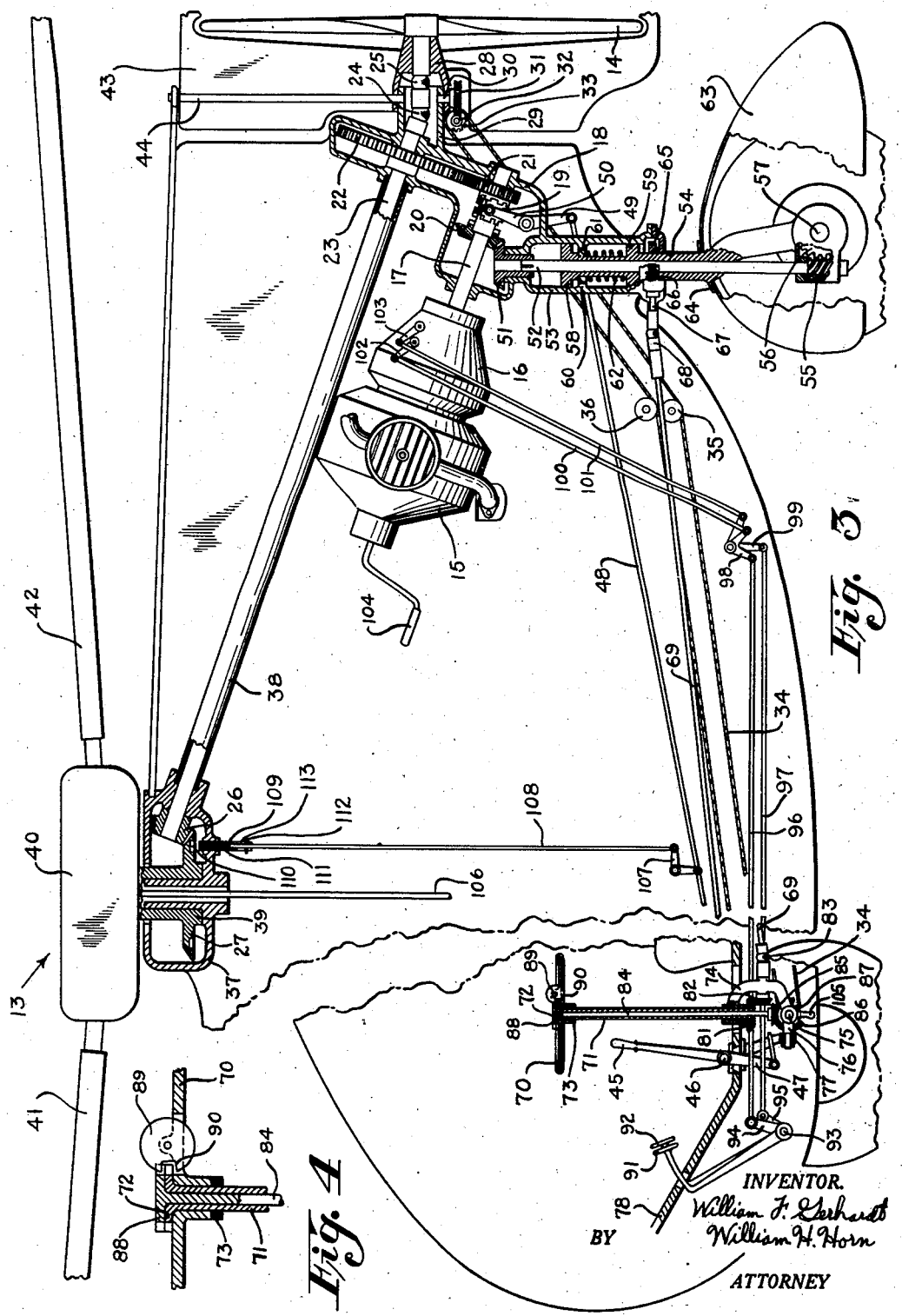
INVENTOR.
William F. Gerhardt
William H. Horn
BY
ATTORNEY Patented Nov. 1, 1938

2,135,073

UNITED STATES PATENT OFFICE 2,135,073

VEHICLE

William F. Gerhardt and William H. Horn, Detroit, Mich.

Application June 21, 1937, Serial No. 149,304

3 Claims. (Cl. 244—50)

This invention relates to vehicles, and in particular it relates to a vehicle primarily designed to operate in the air and having in combination a secondary feature of being operable as a land vehicle.

It is an object of our invention to provide a vehicle universally adaptable to navigate either in the air or on land without requiring any constructural change in such conversion.

Another object is to provide in combination a land and air vehicle in which the conversion may be controlled entirely from the driver's seat through suitable control mechanisms. A further object of our invention is to utilize means for producing a direct lift in combination with apparatus for compensating the torque of the lift producing means.

A still further object is to utilize a two blade direct lift means whereby when such means is substantially in parallel relation with the longitudinal axis of the vehicle, said means does not project excessively beyond the dimensions of the vehicle so as to interfere with its normal operation as a land vehicle.

Further objects of the invention are, the creation of an inexpensive, simple and easily operated mechanism for controlling the operation of the combination vehicle. These and other objects and advantages will appear more fully in the following detailed description when considered in connection with the accompanying drawings, in which:

Fig. 1 is a plan view of a vehicle embodying the features of our invention;

Fig. 2 is a side elevational view thereof;

Fig. 3 is a portion of a side elevational view partly in section illustrating the driving and control mechanisms; and Fig. 4 is an enlarged detail view, in section, of a portion of the steering mechanism.

With reference in particular to Figures 1 and 2 we show a vehicle body 1 generally in stream-line shape simulating a tear-drop profile. The body of the vehicle is reinforced by structural elements (not shown) in accordance with conventional practice in aircraft design. The body 1 is normally supported by landing wheels 2 and 3 and a tail wheel 4. The landing wheels 2 and 3 connect with axle frames 5 and 6 which are pivotally joined to the body 1 of the vehicle. Conventional shock absorbers 7 and 8 join with the axle frames 5 and 6 respectively and to the vehicle body 1, and function to absorb shocks upon the landing of the vehicle from the air and operate as conventional automobile springs during the operation of the vehicle on land. Stream-line fenders or guards 9 and 10 partially inclose the landing wheels 2 and 3 respectively. The vehicle body, among other conventional features, includes a seating arrangement 11 and a door 12 to facilitate ingress and egress to and from the vehicle.

Navigation of the vehicle as an aircraft is contingent upon two operating means, a primary screw or vertical lift propeller 13 and a secondary screw or torque compensating propeller 14.

As shown in Fig. 3, the power means comprises an engine 15 positioned on an inclined axis and located aft of the vehicle. Suitable engine supports (not shown) connect with structural members of the body. Associated with the engine 15 is a transmission case 16 including a conventional planetary type of transmission, a clutch, and a brake. A shaft 17 extending from the transmission case is supported in bearings forming a part of a gear housing 18.

A double acting clutch sleeve 19 slidably keyed to the shaft 17 is adaptable for co-operable engagement with either a bevel gear 20 or a spur gear 21. Both of these gears, normally, are free to rotate about the shaft 17 unless engaged with the clutch sleeve 19 at which time one of the gears becomes, in effect, keyed to the shaft 17.

The bevel gear 20, associates with means hereinafter described, for driving the tail wheel 4 when the vehicle is operated upon land. The spur gear 21 associates with means for driving the vertical lift propeller 13 and the torque compensating propeller 14. Meshing with the gear 21 is a driven gear 22 keyed to a shaft 23. One end of this shaft 23 is directly connected through universal couplings 24 and 25 to the torque compensating propeller 14. The opposite end of the shaft 23 carries a bevel gear 26, keyed thereto, for meshing with a bevel driven gear 27 for the purpose of driving the vertical lift propeller 13.

A hub 28 is vertically pivoted in alignment with the center of the universal couplings 24 and 25 and is supported by an extension member 29 projecting from the gear housing 18. The hub 28 serves as a support for the end of the universal coupling 25 which is rigidly attached to the propeller 14. A pin 30 which forms the pivot between the hub 28 and the extension member 29 is secured to the hub 28 and to a worm wheel 31 meshing with a worm 32.

As thus constructed, the axis of the propeller 14 is capable of a horizontal movement up to ninety degrees relative to the longitudinal axis of the vehicle. By pivoting the axis of the propeller 14, in this manner, it is possible to compensate the torque of the vertical lift producing means to any desired degree and at the same time to alter the lateral and longitudinal direction of flight.

The shaft upon which the worm 32 is keyed carries a sprocket 33 for associating with a chain 34. Guide sheaves 35 and 36 assist in properly positioning the chain 34. The chain 34, in turn, engages with manual controls as hereinafter described, for effectuating pivotal movement of the axis of the propeller 14.

Bevel gears 26 and 27 for driving the vertical lift propeller are supported and contained within a gear housing 37 attached to the framework of the upper portion of the vehicle body. A tubular member 38 further supports the drive mechanism and encloses the shaft 23. A hub 39 extending from the gear housing 37 and about which the gear 27 is rotatable, is tubular in form so as to provide an aperture through which control means may extend for varying the position of the blades of the vertical lift propeller. A hub enclosure 40 contains conventional means (not shown) for controlling variable pitch blades 41 and 42 forming the vertical lift propeller 13.

A rudder 43 is secured to the hub 28 and is supported by a pin 44 forming a continuation of the pivot pin 30 which joins the hub 28 with the extension member 29. The rudder, therefore, moves with the hub 28 and is subject to actuation by the controls which impart directional pivot movement to the torque compensating propeller 14.

In addition to driving the vertical lift and torque compensating propellers, the motor 15 through the shaft 17 is functionable to drive the tail wheel 4 when the vehicle is used for operation on land. In such case the operator actuates a hand lever 45 which moves the clutch sleeve 19 along the shaft 17 so as to engage with the bevel gear 20. The hand lever 45 is pivoted at 46 and an extension arm 47 forming a continuation of the lever 45 pivotally connects with a rod 48 which at its opposite end is hingedly connected to an arm 49 attached to a clutch operating yoke lever 50.

The bevel gear 20 is continually in mesh with a bevel gear 51 positioned on a vertical axis. This gear 51 associates with a vertical drive shaft 52 in a slidable keyed relation. The shaft 52 is supported within a cylindrical housing 53 forming a continuation in part of the gear housing 18 and enclosing mechanism which operates as a conventional shock absorber of the oil or liquid type. In general, it consists of a tubular piston rod 54 which forms the structural element for supporting the tail wheel 4. The vertical drive shaft 52 extends through the piston rod 54 and at its lower end attaches with a worm 55 positioned in engaging relation with a worm wheel 56 secured to the axle 57 of the tail wheel 4. The upper end of the piston rod 54 takes the form of a piston 58 slidable within the cylindrical wall of the enclosure 53. A secondary piston 59 extending from the piston rod 54 and near the lower end of the enclosure 53 is in spaced relation with the piston 58. Interposed between the pistons 58 and 59 is a restriction 60 extending inwardly from the walls of the enclosure 53 and including by-pass apertures 61 for the purpose of permitting the flow of a fluid from within the space formed between the restriction 60 and the piston 59. A spring 62 normally maintains the piston 59 and the tail wheel 4 in its lower normal position. A stream-line guard or fender 63 partially covers the tail wheel 4 and is secured to the lower end of the piston rod 54 by means of a flange 64 extending therefrom.

In order to effect means for steering the tail wheel we provide a worm gear 65 slidably keyed to the piston rod 54 and meshing with a worm 66. A shaft 67 attached to the worm 66 connects with a universal joint 68, the sleeve of which is in slidable keyed relation with a shaft 69. The opposite end of the shaft 69 attaches with manual control means hereinafter described.

Manual controls are provided for positioning the torque compensating propeller 14 and for steering the tail wheel 4. The principal control for accomplishing this purpose is in the form of a steering wheel 70 which through its associated mechanism is capable of the multiple function of positioning the torque compensating propeller and/or steering the tail wheel, in combination with the conventional function of a joy stick as it relates to longitudinal or lateral movements or combinations thereof.

Normally the steering wheel 70 is freely rotatable about a tubular steering post 71. A flange 72 at the upper end of the steering post 71 and a collar 73 spaced therefrom retain the steering wheel in proper position. The steering post is supported near its lower end by a yoke bracket 74 longitudinally hinged at 75 to a right angle pin 76 which in turn is laterally hinged to a bracket 77 secured to a floor 78 of the vehicle. In this manner of attachment it is possible to move the steering post radially on its pivotal supports in a longitudinal and/or lateral direction without interfering in its function as a control for operating the torque compensating propeller and/or the tail wheel assembly. The purpose of providing the pivotal movement of the steering post is to permit an arm 105 secured at the lower end of the bracket 74 to co-operate with a conventional lever system for varying the pitch of the propeller blades 41 and 42. A rod 106 extending from the hub enclosure 40 and through the aperture of the gear housing hub 39 exemplifies the manner of control rods with which the arm 105 operates.

It should be noted that in accordance with conventional practice of controlling the relative positions of the propeller blades 41 and 42 it is essential that the steering wheel and post, as a joy stick, be pivotally moveable as hereinbefore described.

A bevel gear 81 attached to the steering post 71, at its lower end, engages with a bevel gear 82 supported by the bracket 74. This gear 82 is secured to a universal joint 83 which in turn attaches with the steering rod 69. Thus, axial rotary movement of the tubular steering post 71 will operate to actuate pivotally the tail wheel assembly.

In addition to its function in steering the tail wheel, the steering control unit also functions to vary the pivotal positions of the torque compensating propeller 14 and the rudder 43. A shaft 84 extends through the tubular steering post 71 and at its lower end carries a bevel gear 85 which meshes with a bevel gear 86 mounted on the angle pins 76 and 75. A sprocket 87 attached to the gear 86 engages with the chain 34 previously described.

As shown in particular in Fig. 4, the upper end of the shaft 84 terminates in a flange 88 positioned in adjacent relation with the flange 72 extending from the tubular steering post 71. These flanges 72 and 88 are provided with a plurality of notches into which may be engaged a wheel 89 secured in rotatable relationship to one of the spokes of the steering wheel 70. A single notch 90 is cut into the wheel 89 so that by manual movement of the wheel 89 the notch 90 may be positioned in alignment with one of the notches of either of the flanges 72 or 88. In this manner, either the tubular steering post 71 or the shaft 84 may be selectively locked with the steering wheel 70. Thus manual axial movement of the steering wheel 70 may function to operate either the tail wheel assembly or the torque compensating propeller and rudder.

When the vehicle is used for operating on land, manual controls are provided in the form of foot pedals 91 and 92. These pedals 91 and 92 are pivotally mounted on a shaft 93 and have arms 94 and 95 extending upwardly from the shaft 93 but secured respectively to the arms of the pedals 91 and 92. Rods 96 and 97 connect at one end to the arms 94 and 95 respectively, and at the opposite end connect with bell cranks 98 and 99 respectively. Secondary rods 100 and 101 join with the bell cranks 98 and 99 respectively and are pivotally attached to levers 102 and 103 extending from the transmission case 16.

The foot pedal 91 and its associated control mechanism may thus operate in combination with conventional planetary transmission mechanisms within the transmission housing 16 in a manner so as to provide a first speed or reduced gearing ratio when the pedal is entirely depressed, will operate as a clutch in its intermediate position and will produce a direct drive from the motor 15 to the shaft 17 when the pedal 91 is in its uppermost position. The pedal 92 and its associated control mechanism may, for example, function with conventional means within the transmission housing 16 to operate as a brake.

Starting means as a crank handle 104 is provided at one end of the motor 15 in an accessible position to the pilot or operator.

When the vehicle is used in operation on land, means are provided for automatically locking the vertical screw propeller 13 against rotation. This is accomplished through the manual operation of the hand lever 45 which is adaptable to connect the engine 15 with the tail wheel driving assembly. The rod 48 which connects with the arm 47 forming a continuation of the hand lever 45 pivotally connects with a bell crank 107 adaptable upon axial movement of the rod 48 to cause vertical movement of a rod 108 which engages with a locking pin 109. The engagement with the locking pin 109 is such that the locking pin will not be positively forced into locking position but will operate to lock the vertical screw propeller when its blades extend substantially in a longitudinal direction relative to the body of the vehicle.

The locking relation occurs between the locking pin 109 and the vertical screw propeller driven gear 27. Annular indentations 110 extend into the under side of the driven bevel gear 27 and are positioned in such manner that engagement with the locking pin 109 occurs only when the blades of the vertical screw propeller are positioned in a longitudinal direction relative to the body of the vehicle. The locking pin 109 extends through the gear housing 37 in complementary relationship with the indentations 110 in the gear 27.

When the rod 108 is moved vertically upward it engages with a spring 111 which in turn presses against the locking pin 109 moving it against the lower surface of the gear 27. Thereafter, when either of the indentations 110 come into alignment with the locking pin 109 the pin 109 snaps into locking relation with the gear 27. An attaching pin 112 secured to the rod 106 is vertically slidable in a slot 113 in the locking pin 109, thus providing definite means for disengaging the locking pin with the gear 27 upon downward movement of the rod 106.

In the operation of the vehicle for travelling on land, the hand lever 45 is first operated so as to place the clutch sleeve 19 in a neutral position between the bevel gear 20 and the spur gear 21. When this is accomplished the motor 15 may be started and the foot pedal 91 is depressed to its intermediate position so as to disengage a conventional clutch within the transmission housing 16. After this operation, the hand lever 45 is actuated forward, thus moving the clutch sleeve 19 into engagement with the bevel gear 20. The operator next depresses the foot pedal 91 to its maximum stroke thus placing the transmission mechanism in its first speed position. When the vehicle has been sufficiently accelerated, the pedal 91 may be entirely released, which will in effect couple the motor 15 in direct driving relation with the shaft 17. As herein described, the operation of the vehicle on land is substantially similar to the operation of conventional motor vehicles.

The steering apparatus as controlled by the hand wheel 70 connected with the steering post 71, functions to move the tail wheel 4 about its vertical axis to any angular degree. If desired, the tail wheel may be moved to an angle of 180 degrees and the effect of this movement may be utilized as a substitute for reversing or backing up the vehicle. However, it is to be understood that conventional means may be employed in co-operation with the planetary transmission mechanism for accomplishing the reversibility of the vehicle.

It is to be further understood that the vehicle may include such conventional means as an accelerator pedal and other controls usually included in conventional automotive vehicles for controlling the operation of the motor. When it is desired to bring the vehicle to a stop the operator permits the pedal 91 to assume its intermediate position thereby disconnecting the motor 15 from the driving means associated with the tail wheel 4. While the pedal 91 is in its intermediate position the hand lever 45 may be drawn backward to a neutral position so that the gear 20 is disengaged from the clutch sleeve 19.

When the vehicle is to be operated as an aircraft the operator or pilot again depresses the pedal 91 to its intermediate position to disengage the clutch within the transmission housing 16. The pilot thereupon moves the hand lever 45 to a rearward position so that the clutch sleeve 19 engages with the spur gear 21. When this is accomplished the clutch pedal 91 may be released and the vertical lift screw propeller 13, and the torque compensating propeller 14 will be set into operation. Thereafter, the pilot may actuate the hand wheel 70, selectively coupled to the steering post 84 through the locking disc 89 for positioning the torque compensating propeller 14 in a proper relation for off-setting the torque produced by the vertical lift screw propeller 13. The rudder 43 is directly connected to and moves with the means for supporting the torque compensating propeller. In this way the rudder and torque